United States Patent
Liu et al.

(10) Patent No.: US 11,778,487 B2
(45) Date of Patent: Oct. 3, 2023

(54) SCENE-BASED BEAM GENERATION METHOD FOR GROUND-TO-AIR COVERAGE BASED ON CONVEX POLYGON SUBDIVISION

(71) Applicant: Xidian University, Xi'an (CN)

(72) Inventors: Junyu Liu, Xi'an (CN); Min Sheng, Xi'an (CN); Songtao Lei, Xi'an (CN); Ziye Zhang, Xi'an (CN); Yan Shi, Xi'an (CN); Yu Su, Xi'an (CN); Jiandong Li, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 17/752,865

(22) Filed: May 25, 2022

(65) Prior Publication Data
US 2023/0146215 A1    May 11, 2023

(30) Foreign Application Priority Data
Nov. 8, 2021    (CN) .......................... 202111312875.1

(51) Int. Cl.
*H04W 16/28* (2009.01)
*H04W 16/18* (2009.01)

(52) U.S. Cl.
CPC .......... *H04W 16/28* (2013.01); *H04W 16/18* (2013.01)

(58) Field of Classification Search
CPC ..... H04W 16/28; H04W 24/02; H04W 16/18; H04W 72/046; G06N 3/006
See application file for complete search history.

(56) References Cited

U.S. PATENT DOCUMENTS

| | | | |
|---|---|---|---|
| 7,146,296 B1* | 12/2006 | Carlbom | H04S 7/00 381/63 |
| 10,039,012 B2* | 7/2018 | Kim | H04W 16/28 |
| 11,277,755 B2* | 3/2022 | Park | H04B 17/3912 |
| 2004/0054433 A1* | 3/2004 | Kobbelt | G05B 19/4069 700/161 |
| 2008/0102812 A1* | 5/2008 | Chari | H01Q 9/32 455/424 |
| 2012/0004001 A1* | 1/2012 | Power | H04W 24/02 455/507 |
| 2014/0274076 A1* | 9/2014 | Hyslop | H01Q 25/00 455/446 |

(Continued)

*Primary Examiner* — Jaison Joseph
(74) *Attorney, Agent, or Firm* — Zhigang Ma (57) ABSTRACT

A scene-based beam generation method for ground-to-air coverage based on convex polygon subdivision is provided and includes: obtaining a collection of base station positions by using a method of universal transverse mercator projection; constructing a three-dimensional (3D) low altitude signal coverage area; performing convex polygon subdivision on the area to be covered; and generating a beam configuration of each base station. The method realizes generation of beam configurations of base stations in the 3D low altitude signal coverage area, overcomes a problem that the existing 17 kind of scene-based beams cannot realize the coverage of 3D area, overcomes a problem of mismatch between network state information and beam configuration caused by dynamic adjustment of beam configurations. The beam configurations generated by the method does not need to obtain the number of users in real time to adjust the beam, and has a good coverage ability.

7 Claims, 3 Drawing Sheets

(56) References Cited

U.S. PATENT DOCUMENTS

2018/0152671 A1* 5/2018 Miyano ................ G05D 1/0202
2020/0221320 A1* 7/2020 Hyslop ................. H04W 36/32
2023/0146215 A1* 5/2023 Liu ....................... H04W 16/28
                                                              375/267

* cited by examiner

A collection of base station positions is obtained by using a method of UTM projection.

↓

A 3D low altitude coverage area is built

↓

A area to be covered is performed convex polygon subdivision

↓

A beam configuration of each base station is generated

SCENE-BASED BEAM GENERATION METHOD FOR GROUND-TO-AIR COVERAGE BASED ON CONVEX POLYGON SUBDIVISION

TECHNICAL FIELD

The disclosure relates to a field of communications technologies, in particular to a scene-based beam generation method for ground-to-air coverage based on convex polygon subdivision.

DESCRIPTION OF RELATED ART

Combined with current common 5th generation mobile communication technology (5G) network application scenes, a user service demand in medium and low altitude areas has increased significantly, such as high-rise building users or aerial unmanned aerial vehicle (UAV) terminals, but a vertical coverage capacity of traditional base station antenna is limited, resulting in poor signal coverage quality for the users in the medium and low altitude areas. In addition to a horizontal dimension planning, 5G Massive multiple-input multiple-output (MIMO) antenna also considers a vertical dimension planning, which can flexibly provide beam scene selection for the users in different high-rise buildings, so as to improve the coverage of the medium and low altitude areas and optimize the user experience. At present, there are 17 kinds of Massive MIMO Broadcast Beam scene-based configuration plus a default mode. However, the scene-based beam configuration in a ground-to-air coverage scene is in a vacant state, it is necessary to calculate a beam width, an antenna tilt angle and other parameters of each base station according to characteristics of the ground-to-air coverage scene.

Peng Dongsheng proposed a method to generate and adjust Massive MIMO scene-based beam in different scenes in his article "Massive MIMO Broadcast Beam Sceneization" (China Telecom Anhui Branch, communication technology, 2020). Main steps of this method are as follows: (1) selecting a scene with antenna directly facing a high-rise building for testing, and there is no shielding between the antenna and the tested high-rise building and a distance between the antenna and the tested high-rise building is appropriate; (2) selecting a scene with antenna directly facing a square for testing, and there is no shelter between the antenna and the square to be tested and the distance between the antenna and the square to be tested is appropriate; (3) selecting an area with dense stations for testing; (4) adjusting beam parameters according to received signal strength of different test scenes under different beam configurations. There are two shortcomings of this method: first, the test scene of this method is a single housing estate. In fact, the building distribution, interference and pedestrian density of the area covered in each housing estate may be different, so it needs to be tested repeatedly when deploying network of the multi housing estates, which is inefficient. Second, the scenes tested by this method are mainly aimed at low altitude scenes, the height is generally lower than 100 meters (m), and coverage scenes with a height of at least 300 in are not tested, which cannot guide and design the generation of antenna beam in the ground-to-air scene.

Shanghai Qingkun Information Technology Co., Ltd. proposed a synchronization signal block (SSB) broadcast beam optimization method in its applied patent "an SSB broadcast beam optimization method and system" (Application No.: CN202011172630.9, Application Publication No.: CN112351439 A). Steps of this method are: (1) acquiring the number of initial user equipment (UE) of the SSB beam configuration in the broadcast beam coverage range; (2) measuring an arrival angle of each initial user equipment according to a physical random access channel, a physical layer uplink control channel demodulation reference signal, a physical layer uplink shared channel demodulation reference signal and/or a detection reference signal; (3) determining a three-dimensional (3D) space distribution of the initial user equipment according to the arrival angle of each initial user equipment; (4) obtaining the number of current user equipment of the SSB beam configuration in the broadcast beam coverage range; (5) judging whether a condition of changing the SSB beam is met or not according to the number of the current user equipment; and if so, changing the SSB beam configuration according to the 3D space distribution. Obtaining a distribution condition of the UE according to the measurement of the uplink signal, and determining the beam direction of the SSB according to the distribution of the UE, so that optimizing the beam configuration of the SSB. There are two shortcomings in this method: first, in order to ensure coverage, this method needs to obtain the current number of user equipment of the SSB beam configuration in the broadcast beam coverage in real time, which is generally difficult to realize in the actual communication network; and second, due to the dynamic nature of the current network, the SSB beam configuration strategy is obtained for the network information at a certain time, the network condition has changed when the strategy is implemented, and the implemented strategy is no longer applicable to the network at this time. Therefore, the SSB beam configuration based on this method cannot effectively improve the coverage and user perception.

SUMMARY OF THE DISCLOSURE

In order to solve the above problems in the prior art, the disclosure provides a scene-based beam generation method for ground-to-air coverage based on convex polygon subdivision. The technical problem to be solved by the disclosure is realized by the following technical schemes.

The disclosure provides a scene-based beam generation method for ground-to-air coverage based on convex polygon subdivision, including:

step 1: obtaining a collection of position information of ground base stations in a scene;

step 2: constructing a 3D low altitude signal coverage area according to the position information of the ground base stations;

step 3: performing convex polygon subdivision on the 3D low altitude signal coverage area to obtain a plurality of n-prism areas, taking the ground base stations on a bottom surface of each of the plurality of n-prism areas as vertexes to build quadrangular pyramid models to cover corresponding the n-prism area, and obtaining corresponding relationships between geometric parameters of each of the quadrangular pyramid models and beam parameters of a corresponding ground base station sector; and step 4: optimizing a coverage upper limit and a coverage lower limit of each the ground base station sector in each of the plurality of n-prism areas by using a particle swarm optimization (PSO) algorithm with adaptive weight to obtain optimized results, and obtaining a beam configuration range of each of the ground base stations according to the optimized results.

In an embodiment, the step 1 includes:
converting position coordinates of each of the ground base stations in the scene in a longitude and latitude coordinate system into corresponding position coordinates in a plane coordinate system by using a method of universal transverse mercator (UTM) projection; and the converted position coordinates forming the collection of the position information of the ground base stations in the scene.

In an embodiment, the 3D low altitude signal coverage area is a 3D multi prism shape with a polygon bottom and a height of H, where H≤3000, a contour of the polygon bottom is formed by connecting positions of the ground base stations close to edges of the scene in the scene.

In an embodiment, the ground base stations in each of the plurality of n-prism areas are respectively responsible for signal coverage at different heights and orientations in each of the plurality of n-prism areas.

In an embodiment, the bottom surface of each of the plurality of n-prism areas is a convex n-polygon with the ground base stations as vertexes, and there is no an overlapping area between any two of the convex n-polygons of the plurality of n-prism areas, and n is 3 or 4.

In an embodiment, the step 3 includes:
step 3a: performing convex polygon subdivision on the collection of position information of the ground base stations by using a rotating calipers algorithm to divide a bottom surface of the 3D low altitude signal coverage area into the convex n-polygons;
step 3b: extending each edge of each of the convex n-polygons in a longitudinal vertical direction along the 3D low altitude signal coverage area to obtain the plurality of n-prism areas with the convex n-polygons as the bottom surfaces and heights of H;
and step 3c: taking the ground base stations on the bottom surface of each of the plurality of n-prism areas as the vertexes to build the quadrangular pyramid models to cover the corresponding n-prism area, and obtaining the corresponding relationships between the geometric parameters of each of the quadrangular pyramid models and the beam parameters of the corresponding ground base station sector;
a longitudinal angle of each of the quadrangular pyramid models corresponding to a longitudinal beam width of the corresponding ground base station sector, a horizontal angle of each of the quadrangular pyramid models corresponding to a horizontal beam width of the corresponding ground base station sector, and an included angle between each of the quadrangular pyramid models and ground corresponding to an antenna uptilt angle of the corresponding ground base station sector.

In an embodiment, the step 4 includes:
step 4a: calculating an initial coverage rate and an initial overlap rate of each of the plurality of n-prism areas by using a Monte Carlo analysis method;
step 4b: optimizing the coverage upper limit and the coverage lower limit of the ground base station sector in each of the plurality of n-prism areas by using the PSO algorithm with adaptive weight, and calculating, according to optimized coverage upper limit and optimized coverage lower limit of the ground base station sector and the corresponding relationships, a coverage rate and an overlap rate of the corresponding n-prism area by using the Monte Carlo analysis method in each the optimizing until a preset optimization iteration stop condition is reached to obtain the optimized results of the coverage upper limit and the coverage lower limit of the ground base station sector; and
obtaining beam parameters of the ground base station sector according to the optimized results of the coverage upper limit and the coverage lower limit of the ground base station sector, counting the beam parameters of each the ground base station sector to select a maximum value and a minimum value corresponding to the beam parameters, and thereby to obtain the beam configuration range of the ground base station;
the beam parameters including a horizontal beam width, a longitudinal beam width and an antenna uptilt angle, and the optimization iteration stop condition being that an overlap rate of the n-prism area is a minimum under a condition that a coverage rate is greater than or equal to a preset value R, R∈(0,0.99].

Compared with the prior art, the disclosure has the following beneficial effects:

1. The scene-based beam generation method for ground-to-air coverage based on convex polygon subdivision of the disclosure constructs the 3D multi prism shape with the polygon bottom and the height of H as the 3D low altitude signal coverage area with, thus a coverage scene of the disclosure is expanded from a 3D area with a height less than 100 in in the prior art to at least 300 in in height, by performing convex polygon subdivision on the 3D low altitude signal coverage area and obtaining the optimal coverage upper limit and the optimal coverage lower limit according to the Monte Carlo analysis method and the PSO algorithm with adaptive weight, a beam configuration range of each base station sector (also referred to as ground base station sector) is calculated, which solves a problem that the traditional 17 kinds of scene beams in the prior art cannot realize the coverage of 3D areas with a height of 300 in and above, in the ground-to-air coverage scene, the beam configuration of each base station sector of the disclosure is generated without repeated testing, which is efficient and guides and design the generation of the antenna beam in the ground-to-air scene.

2. In the scene-based beam generation method for ground-to-air coverage based on convex polygon subdivision of the disclosure, the beam configuration of each ground base station is obtained based on an optimization goal that an overlap rate of each prism area is the smallest under the condition that an coverage rate is greater than or equal to a preset value R, R∈(0,0.99], and the beam configuration will not change, it solves a problem that the traditional SSB beam optimization method in the prior art needs to dynamically adjust the beam configuration of the SSB, resulting in the mismatch between the network state information and the beam configuration, the beam configuration generated by the disclosure does not need to obtain the number of users in real time to adjust the beam, has good coverage ability, and can greatly improve the user perception.

The above description is only an overview of the technical schemes of the disclosure. In order to better understand the technical means of the disclosure, it can be implemented in accordance with the contents of the description. In order to make the above and other purposes, features and advantages of the disclosure more obvious and easier to understand, the following preferred embodiments are given in detail with the accompanying drawings.

DETAILED DESCRIPTION OF EMBODIMENTS

In order to further elaborate the technical means and effects adopted by the disclosure to achieve the predetermined purpose of the disclosure, a scene-based beam generation method for ground-to-air coverage based on convex polygon subdivision proposed according to the disclosure is described in detail below in combination with the attached drawings and specific embodiments.

The foregoing and other technical contents, features and functions of the disclosure can be clearly presented in the following detailed description of the specific embodiment combined with the accompanying drawings. Through the description of the specific embodiment, we can have a more in-depth and specific understanding of the technical means and effects adopted by the disclosure to achieve the predetermined purpose. However, the attached drawings are only for reference and explanation, not for limiting the technical scheme of the disclosure.

Embodiment 1

This embodiment provides a scene-based beam generation method for ground-to-air coverage based on convex polygon subdivision, including step 1 to step 4.

In the step 1: obtaining a collection of position information of ground base stations in a scene.

In this embodiment, position coordinates of each ground base station (also referred to as base station) in a longitude and latitude coordinate system in the scene are converted into corresponding position coordinates in a plane coordinate system by using a method of universal transverse mercator (UTM) projection, and the converted position coordinates form the collection of position information of all the ground base stations in the scene.

In the step 2: constructing a three-dimensional (3D) low altitude signal coverage area according to the position information of the ground base stations (also referred to as base station positions).

In this embodiment, the 3D low altitude signal coverage area is a 3D multi prism shape with a polygon bottom and a height of H, where H≤3000, a contour of the polygon bottom is formed by connecting positions of the ground base stations close to edges of the scene in the scene. It should be noted that a value of the height H is determined by a distribution height of low altitude user terminals.

In the step 3: performing convex polygon subdivision on the 3D low altitude signal coverage area to obtain a plurality of n-prism areas, taking the ground base stations on a bottom surface of each of the plurality of n-prism areas as vertexes to build quadrangular pyramid models to cover corresponding the n-prism area, and obtaining corresponding relationships between geometric parameters of each of the quadrangular pyramid models and beam parameters of a corresponding ground base station sector.

In this embodiment, the bottom surface of each n-prism area is a convex n-polygon with the ground base stations as vertexes, and there is no an overlapping area between any two convex n-polygons, and n is 3 or 4. The ground base stations in each n-prism area are respectively responsible for signal coverage at different heights and orientations in the each n-prism area.

Specifically, the step 3 includes step 3a to step 3c.

In the step 3a, performing convex polygon subdivision on the collection of position information of the ground base stations by using a rotating calipers algorithm to divide a bottom surface of the 3D low altitude signal coverage area into the convex n-polygons.

In the step 3b, extending each edge of each of the convex n-polygons in a longitudinal vertical direction along the 3D low altitude signal coverage area to obtain the plurality of n-prism areas with the convex n-polygons as the bottom surfaces and heights of H.

In the step 3c, taking the ground base stations on the bottom surface of each of the plurality of n-prism areas as the vertexes to build the quadrangular pyramid models to cover the corresponding n-prism area, and obtaining the corresponding relationships between the geometric parameters of each of the quadrangular pyramid models and the beam parameters of the corresponding ground base station sector.

In this embodiment, a longitudinal angle of each quadrangular pyramid model corresponds to a longitudinal beam width of the corresponding ground base station sector, a horizontal angle of each quadrangular pyramid model corresponds to a horizontal beam width of the corresponding ground base station sector, and an included angle between each quadrangular pyramid model and ground corresponds to an antenna uptilt angle of the corresponding ground base station sector.

In the step 4, optimizing a coverage upper limit and a coverage lower limit of each the ground base station sector in each of the plurality of n-prism areas by using a particle swarm optimization (PSO) algorithm with adaptive weight to obtain optimized results, and obtaining a beam configuration range of each of the ground base stations according to the optimized results.

Specifically, the step 4 includes step 4a to step 4c.

In the step 4a, calculating an initial coverage rate and an initial overlap rate of each n-prism area by using a Monte Carlo analysis method.

In the step 4b, optimizing the coverage upper limit and the coverage lower limit of the ground base station sector in each n-prism area by using the PSO algorithm with adaptive weight, and calculating, according to optimized coverage upper limit and optimized coverage lower limit of the ground base station sector and the corresponding relationships, a coverage rate and an overlap rate of the corresponding n-prism area by using the Monte Carlo analysis method in each optimizing until a preset optimization iteration stop condition is reached to obtain the optimized results (also referred to as most optimal results) of the coverage upper limit and the coverage lower limit of the ground base station sector.

In the step 4c, obtaining beam parameters of the ground base station sector according to the optimized results of the coverage upper limit and the coverage lower limit of the ground base station sector, counting the beam parameters of each the ground base station sector to select a maximum value and a minimum value corresponding to the beam parameters, and thereby to obtain the beam configuration range of the ground base station.

In this embodiment, the beam parameters include a horizontal beam width, a longitudinal beam width and an antenna uptilt angle, and the optimization iteration stop condition is that an overlap rate of the n-prism area is a minimum under a condition that a coverage rate is greater than or equal to a preset value R, R∈(0,0.99].

The scene-based beam generation method for ground-to-air coverage based on convex polygon subdivision of the embodiment constructs the 3D multi prism shape with the polygon bottom and the height of H as the 3D low altitude signal coverage area, thus a coverage scene of the disclosure is expanded from a 3D area with a height less than 100 in in the prior art to at least 300 in in height, by performing convex polygon subdivision on the 3D low altitude signal coverage area and obtaining the most optimal coverage upper and lower limits according to the Monte Carlo analysis method and the PSO algorithm with adaptive weight, a beam configuration range of each base station sector is calculated, which solves the problem that the traditional 17 kinds of scene beams in the prior art cannot realize the coverage of 3D areas with a height of 300 m and above, in the ground-to-air coverage scene, the beam configuration of each base station sector of the disclosure is generated without repeated testing, which is efficient and guides and designs the generation of the antenna beam in the ground-to-air scene.

Figure 1:
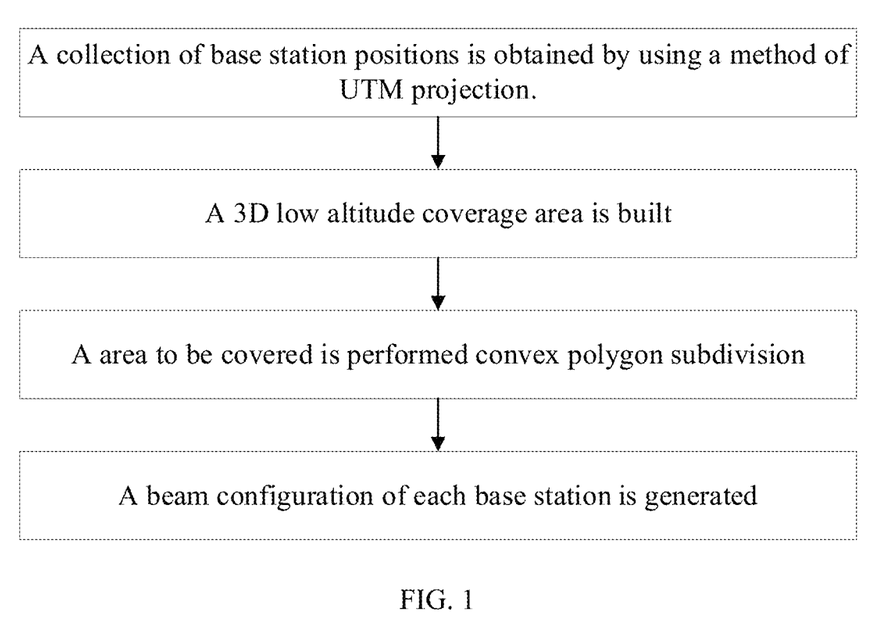
FIG. 1 is a flowchart of a scene-based beam generation method for ground-to-air coverage based on convex polygon subdivision according to an embodiment of the disclosure.

In an illustrated embodiment, FIG. 1 illustrates a flowchart of a scene-based beam generation method for ground-to-air coverage based on convex polygon subdivision, combined with FIG. 1, specific implementation steps of the scene-based beam generation method for ground-to-air coverage based on convex polygon subdivision in the above embodiment are further described in detail. As shown in FIG. 1, the scene-based beam generation method includes the following steps.

In the step 1, obtaining a collection of ground base station positions by using a method of UTM projection.

Position coordinates of each ground base station in a longitude and latitude coordinate system are converted into corresponding position coordinates in a plane coordinate system, and the converted position coordinates of all the ground base stations form the collection of ground base station positions.

In the step 2, constructing a 3D multi prism shape with a polygon bottom and a height of H as a 3D low altitude signal coverage area.

It should be noted that the polygon is usually an irregular polygon. The polygon is an external polygon formed by the connection of all ground base station positions at the most boundary in the collection of ground base station positions, and the H value is determined by the distribution height of low altitude user terminals.

In the step 3: performing convex polygon subdivision on an area to be covered (a bottom surface of 3D low altitude signal coverage area), the step 3 specifically includes step 3a to step 3c.

In the step 3a, performing convex polygon subdivision on the collection of ground base station positions by using a rotating calipers algorithm to divide the bottom surface of the 3D low altitude signal coverage area into MT number of the convex n-polygons. Each convex n-polygon takes the ground base stations as the vertexes, and edges of any two convex n-polygons either do not intersect, or there is exactly one common edge for both. The value of n is 3 or 4, MT represents the total number of convex n-polygons after the subdivision.

In the step 3b, extending each edge of each convex n-polygon after the subdivision of the bottom surface in a longitudinal vertical direction along the 3D low altitude signal coverage area, dividing the irregular prism area to be covered into a plurality of n-prism areas with the convex n-polygons as the bottom surfaces and heights of H.

In the step 3c, each ground base station on the bottom surface of the n-prism area covers the area with signals. n number of ground base stations in each n-prism area each are responsible for covering different height ranges. The coverage range of each ground base station is modeled as a rectangular pyramid with the base stations as the vertexes. Therefore, the signal coverage problem of each n-prism area is transformed into a problem of filling one n-prism area with multiple rectangular pyramids, and the filled area realizes signal coverage. A longitudinal angle and a horizontal angle of the rectangular pyramid correspond to a longitudinal beam width and a horizontal beam width of the base station sector respectively. The included angle between the rectangular pyramid and ground corresponds to the antenna uptilt angle of the base station sector.

In the step 4: generating a beam configuration of each base station. The step 4 specifically includes step 4a to step 4c.

In the step 4a, calculating a signal coverage volume of each n-prism area by using a Monte Carlo analysis method, randomly scattering N number of points in each n-prism area, N≥200000, counting the number of points within the n-prism area as n1, n1/N as a coverage rate, and counting the number of points within a coincidence range of two or more n-prism areas as n2, n2/N as an overlap rate, the volume of each n-prism area is multiplied by its coverage rate and overlap ratio to obtain a coverage volume and an overlap volume of each n-prism area individually. The number of N will be determined according to the convergence of the coverage ratio and the overlap ratio, and the scattering points when the coverage ratio and the overlap ratio do not change with the increase of N will be taken as the best scattering points.

In the step 4b, adopting the PSO algorithm with adaptive weight to adjust the coverage upper limit and the coverage lower limit of each base station sector in each n-prism area to minimize the overlap rate of each n-prism area under the condition that the coverage rate is greater than or equal to R, R∈(0,0.99]. The corresponding horizontal beam width, longitudinal beam width and antenna uptilt angle of the base station sector are calculated according to the optimal coverage upper limit and the optimal coverage lower limit of each base station sector obtained at this time.

In the step 4c, counting the horizontal beam width, the longitudinal beam width and the antenna uptilt angle of each base station sector, and taking their maximum and minimum values as the beam configuration range under the signal coverage scene for the medium and low altitude area when the coverage height is H.

In the scene-based beam generation method for ground-to-air coverage based on convex polygon subdivision of the embodiment, the beam configuration of each ground base station is obtained based on an optimization goal that an overlap rate of each prism area is the smallest under the condition that an coverage rate is greater than or equal to a preset value R, R∈(0,0.99], and the beam configuration will not change, it solves the problem that the traditional SSB beam optimization method in the prior art needs to dynamically adjust the beam configuration of SSB, resulting in the mismatch between the network state information and the beam configuration, the beam configuration generated by the disclosure does not need to obtain the number of users in real time to adjust the beam, has good coverage ability, and can greatly improve the user perception.

Embodiment 2

This embodiment further explains the effect of the scene-based beam generation method for ground-to-air coverage based on convex polygon subdivision described in embodiment 1 through simulation experiments.

1. Simulation Test Conditions

An application platform of the simulation experiment of this embodiment is: the processor is 8-core AMD Ryzen™ 7 4800U 64 bit CPU, a main frequency is 1.80 GHz, and the GPU is AMID Radeon™ Graphics GPU, 16 GB memory.

A software platform of the simulation experiment of this embodiment is windows 10 operating system and MatlabR2018a.

2. Simulation Content and Result Analysis

The simulation experiment of this embodiment adopts the method of embodiment 1 to realize the generation of antenna beam in two different ground-to-air coverage scenes.

Scene 1 is that the ground base stations are deployed according to given positions in a network scene of 15.18 square kilometers. The number of base stations to be covered is 9. The height of the network scene is set to 300 in, the carrier frequency is 2.6 GHz, and the coverage rate is required to be at least greater than 90%.

A collection of the base station positions in scene 1 shown in Table 1 is obtained by using the method of UTM projection.

TABLE 1 list of the collection of base station positions in scene 1

| number | horizontal ordinate/m | longitudinal coordinate/m | antenna hanging height/m |
|---|---|---|---|
| 1 | 459243.06 | 3248533.68 | 18 |
| 2 | 456530.81 | 3249208.41 | 28 |
| 3 | 456343.56 | 3250233.99 | 28 |
| 4 | 458416.74 | 3249232.47 | 15 |
| 5 | 458650.78 | 3250628.63 | 15 |
| 6 | 461444.28 | 3248254.42 | 16 |
| 7 | 453838.47 | 3249430.79 | 21 |
| 8 | 463830.46 | 3248844.3 | 28 |
| 9 | 462541.35 | 3250629.95 | 28 |

Figure 2:
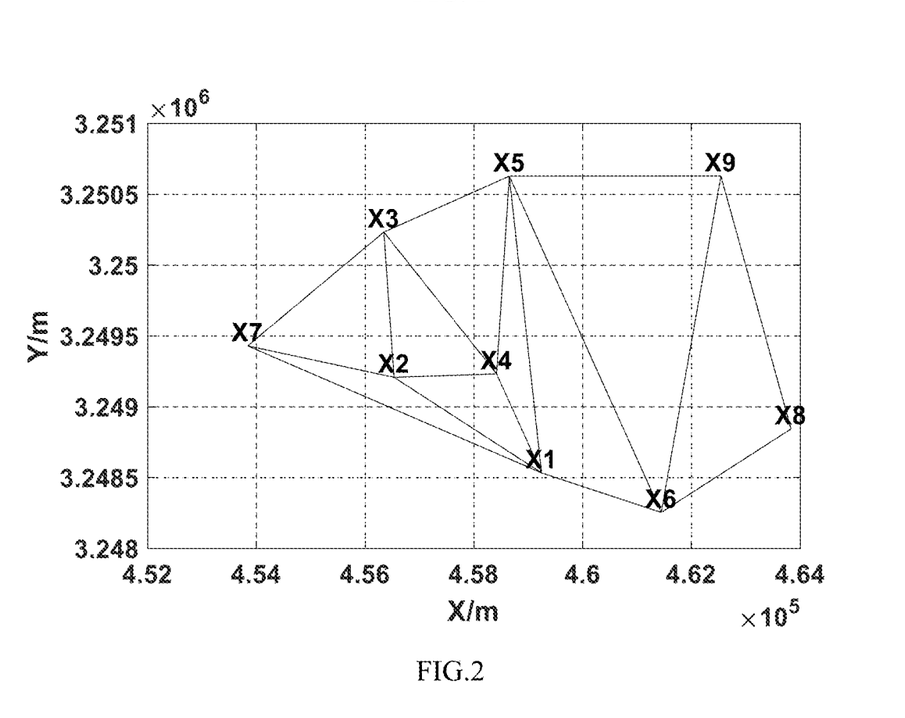
FIG. 2 is a Delaunay triangulation diagram of a collection of base station positions in scene 1 according to an embodiment of the disclosure.

Please refer to FIG. 2. FIG. 2 is the Delaunay triangulation diagram of the collection of base station positions in scene 1 according to an embodiment of the disclosure, that is, a distribution diagram of 9 number of base stations in the plane coordinate system after the UTM projection. X1-X9 in FIG. 2 respectively represent positions of the first to ninth base stations, the horizontal axis represents the X coordinate of the base station, the value is in a range of 452 km to 464 km, and the longitudinal axis represents the Y coordinate of the base station, the value is in a range of 3248 km to 3251 km. Delaunay triangulation is performed according to the position of each base station, and the whole 15.18 square kilometer area is divided into 9 number of triangular areas. The 3D low altitude signal coverage area is divided vertically along each edge of each triangle divided by the bottom of each triangle area. The irregular prism area to be covered is divided into 9 number of triangular prism areas with triangle as the bottom and height of 300 in.

TABLE 2 list of beam configuration of each base station sector in scene I

| base station number | housing estate number | longitudinal beam width (°) | horizontal beam width (°) | uptilt angle (°) |
|---|---|---|---|---|
| 1 | 1 | 12.64 | 4.55 | 4.03 |
|   | 2 | 11.21 | 59.19 | 7.23 |
|   | 3 | 36.80 | 26.25 | 32.79 |
|   | 4 | 4.82 | 87.82 | 1.54 |
| 2 | 1 | 8.14 | 99.62 | 2.17 |
|   | 2 | 40.47 | 170.75 | 25.19 |
|   | 3 | 5.54 | 74.93 | 1.22 |
|   | 4 | 8.81 | 14.70 | 5.60 |
| 3 | 1 | 30.81 | 53.87 | 24.90 |
|   | 2 | 12.96 | 82.57 | 6.82 |
|   | 3 | 17.08 | 35.49 | 12.99 |
| 4 | 1 | 7.10 | 26.52 | 4.14 |
|   | 2 | 4.28 | 73.73 | 1.50 |
|   | 3 | 4.80 | 48.51 | 1.68 |
|   | 4 | 6.15 | 72.20 | 2.15 |
|   | 5 | 11.87 | 139.05 | 4.14 |
| 5 | 1 | 9.12 | 70.78 | 5.64 |
|   | 2 | 29.95 | 57.35 | 24.87 |
|   | 3 | 39.85 | 23.16 | 39.19 |
| 6 | 1 | 11.57 | 126.53 | 6.70 |
|   | 2 | 5.63 | 32.35 | 3.45 |
| 7 | 1 | 41.31 | 4.70 | 43.06 |
|   | 2 | 14.70 | 22.50 | 11.27 |
| 8 | 1 | 18.84 | 27.35 | 14.40 |
|   | 2 | 6.14 | 5.55 | 3.23 |
| 9 | 1 | 3.06 | 26.12 | 0.75 |
|   | 2 | 11.64 | 74.15 | 7.41 |
|   | 3 | 28.18 | 48.61 | 22.38 |
|   | 4 | 25.29 | 59.83 | 19.79 |
|   | 5 | 13.13 | 151.29 | 2.87 |

Table 2 shows the beam configuration table of each base station sector obtained by using the PSO algorithm with adaptive weight. Under the configuration of Table 2, the coverage rate of the whole network is 90% and the overlap rate is 31%. Taking the maximum and minimum values of the parameters shown in Table 2 to obtain the range of the longitudinal beam width of 3.06° to 41.31°, the range of the horizontal beam width of 4.55° to 170.75° and the range of the antenna uptilt angle of 0.75° to 43.06°.

Calculation steps of obtaining the configuration of each base station sector by using the PSO algorithm with adaptive weight are as follows.

The first step is to initialize the population individuals, including individual position and individual speed. The individual position represents the coverage upper limit and coverage lower limit of each base station sector, the initial value is in a range of 0 to 900 in, the individual speed represents the step size of each change of the individual position, the initial value is a random value in a range of −3 to 3, the number of population individuals in the initializing is 20, an acceleration constant is a random value near 2, a maximum value of acceleration weight coefficient is 0.4, a minimum value of acceleration weight coefficient is 0.9, and a search space dimension is 6.

In the second step, according to the Monte Carlo analysis method, 10e7 number of points are randomly scattered in each prism area, the number of points within the rectangular pyramid range is n1, n1/10e7 is the coverage rate, the number of points within the coincidence range of two or more rectangular pyramids is n2, n2/10e7 is the overlap rate, and the coverage rate and the overlap rate under different individual positions are obtained. In each iteration process, the acceleration weight coefficient and individual position are updated adaptively, at the same time, when the coverage rate is greater than or equal to R, R∈(0,0.99], tracking the minimum overlap rate found by the individual and the minimum coverage rate found by the whole population. The coverage rate is obtained as the minimum coverage rate when the coverage rate does not change or when the number of iterations ends. According to the optimal coverage upper limit obtained at this time, the horizontal beam width, longitudinal beam width and the uptilt angle of each base station sector are obtained.

The third step is to count the horizontal beam width, the longitudinal beam width and the uptilt angle of each base station sector, and take their respective maximum and minimum to obtain the configuration range of the antenna beam in this scene.

Figure 3:
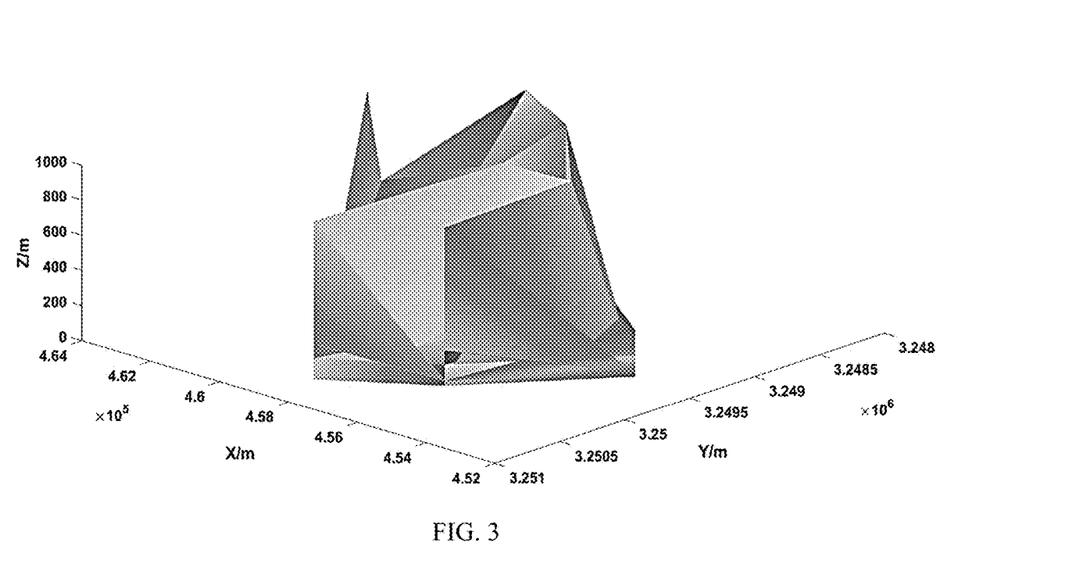
FIG. 3 is a ground-to-air coverage effect diagram in the scene 1 according to an embodiment of the disclosure.

Please refer to FIG. 3. FIG. 3 is the ground-to-air coverage effect diagram in scene 1 according to an embodiment of the disclosure. FIG. 3 is the ground-to-air coverage effect diagram obtained according to the beam configuration in Table 2. The horizontal axis represents the X coordinate, with a value in a range of 452 km to 464 km, the longitudinal axis represents the Y coordinate, with a value in a range of 3248 km to 3251 km, and the vertical axis represents the Z coordinate, with a value in a range of 0 in to 1000 in. The shaded part in the FIG. 3 is the covered area, and the blank area is the uncovered area.

Scene 2 is that the ground base stations are deployed according to given positions in a network scene of 100 square kilometers. The number of base stations to be covered is 13. The height of the network scene is set to 300 in and the carrier frequency is 2.6 GHz. Table 3 shows the position collection table of each base station when the coverage rate is required to be at least greater than 85%.

TABLE 3 list of the collection of base station positions

| number | horizontal ordinate/m | longitudinal coordinate/m | antenna hanging height/m |
|---|---|---|---|
| 1 | −3333.33 | −3333.33 | 28.00 |
| 2 | −3333.33 | 0.00 | 28.00 |
| 3 | −3333.33 | 3333.33 | 28.00 |
| 4 | 0.00 | −3333.33 | 28.00 |
| 5 | 0.00 | 0.00 | 28.00 |
| 6 | 0.00 | 3333.33 | 28.00 |
| 7 | 3333.33 | −3333.33 | 28.00 |
| 8 | 3333.33 | 0.00 | 28.00 |
| 9 | 3333.33 | 3333.33 | 28.00 |
| 10 | −5000.00 | −5000.00 | 28.00 |
| 11 | −5000.00 | 5000.00 | 28.00 |
| 12 | 5000.00 | 5000.00 | 28.00 |
| 13 | 5000.00 | −5000.00 | 28.00 |

Figure 4:
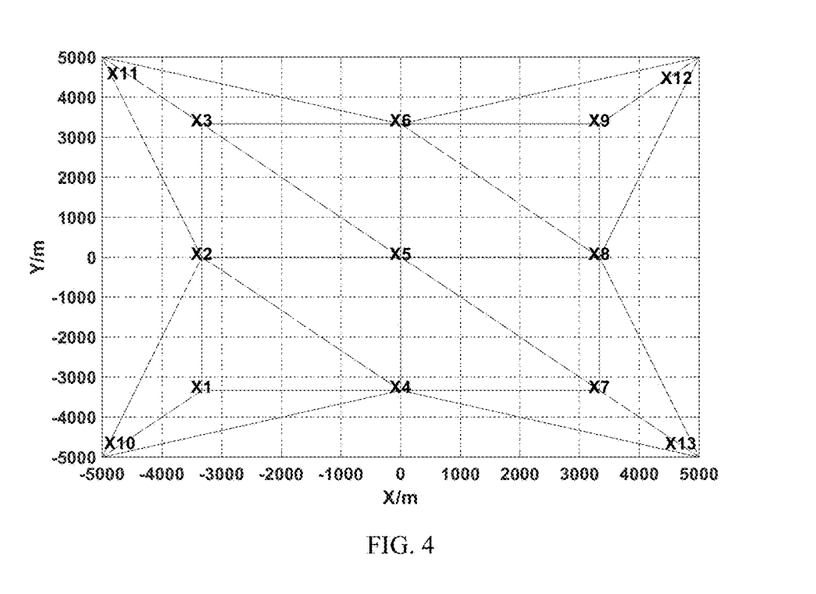
FIG. 4 is a Delaunay triangulation diagram of a collection of base station positions in scene 2 according to an embodiment of the disclosure.
Figure 5:
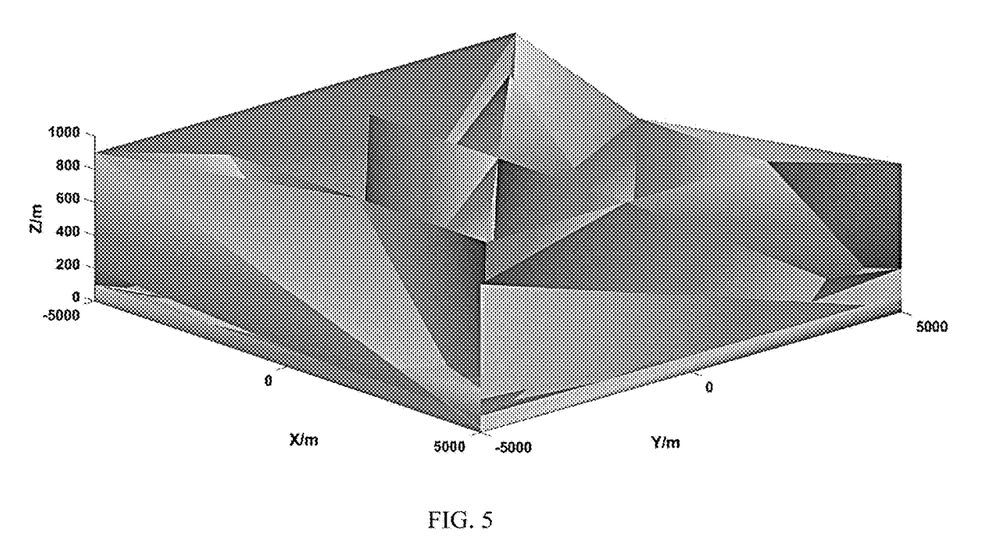
FIG. 5 is a ground-to-air coverage effect diagram in the scene 2 according to an embodiment of the disclosure.

Next, the effect of this simulation will be further described in combination with the simulation diagrams of FIG. 4 and FIG. 5. FIG. 4 is a Delaunay triangulation diagram according to the collection of base station positions in scene 2 according to an embodiment of the disclosure. FIG. 5 is a ground-to-air coverage effect diagram in scene 2 according to an embodiment of the disclosure.

FIG. 4 shows the distribution of 13 number of base stations in Table 3 in the plane coordinate system. X1-X13 in FIG. 4 represents the positions of the first to thirteenth base stations. The horizontal axis represents the X coordinate of the base station, which is in a range of −5 km to 5 km, and the longitudinal axis represents the Y coordinate of the base station, which is in a range of −5 km to 5 km. Delaunay triangulation is performed according to the position of each base station, and the whole 100 square kilometers area is divided into 20 number of triangular areas. The three-dimensional low altitude signal coverage area is divided vertically along each edge of each triangle divided by the bottom of each triangle area, and the irregular prism area to be covered is divided into 20 number of triangular prism areas with triangle as the bottom and height of 300 in.

Table 4 shows the beam configuration table of each base station sector obtained by using the same algorithm as scene 1. Under the configuration of Table 4, the coverage rate of the whole network is 88% and the overlap rate is 32%. Taking the maximum and minimum values of the parameters shown in Table 4 to obtain the range of the longitudinal beam width in a range of 1.72° to 30.33°, the range of the horizontal beam width in a range of 18.43° to 143.13°, and the range of the uptilt angle in a range of 0.38° to 24.43°.

FIG. 5 is a ground-to0air coverage effect diagram obtained according to the beam configuration in Table 4. The horizontal axis represents the X coordinate with the value in a range of −5 km to 5 km, the horizontal axis represents the Y coordinate with the value in a range of −5 km to 5 km, and the vertical axis represents the Z coordinate with the value in a range of 0 in to 1000 in. The shaded part in the FIG. 5 is the covered area, and the blank area is the uncovered area.

TABLE 4 list of beam configuration of each base station sector in scene 2

| base station number | housing estate number | longitudinal beam width (°) | horizontal beam width (°) | uptilt angle (°) |
|---|---|---|---|---|
| 1 | 1 | 12.40 | 135.00 | 6.52 |
|   | 2 | 2.43 | 90.00 | 0.53 |
|   | 3 | 5.43 | 135.00 | 1.19 |
| 2 | 1 | 16.13 | 18.43 | 12.24 |
|   | 2 | 25.14 | 143.13 | 15.05 |
|   | 3 | 16.13 | 18.43 | 12.24 |
|   | 4 | 11.71 | 45.00 | 8.81 |
|   | 5 | 2.43 | 90.00 | 0.53 |
|   | 6 | 3.98 | 45.00 | 2.09 |
| 3 | 1 | 5.43 | 135.00 | 1.19 |
|   | 2 | 30.33 | 135.00 | 24.43 |
|   | 3 | 11.71 | 45.00 | 8.81 |
|   | 4 | 1.72 | 45.00 | 0.38 |
| 4 | 1 | 3.98 | 45.00 | 2.09 |
|   | 2 | 16.13 | 18.43 | 12.24 |
|   | 3 | 11.71 | 45.00 | 8.81 |
|   | 4 | 16.13 | 90.00 | 12.24 |
|   | 5 | 3.44 | 143.13 | 0.76 |
|   | 6 | 5.62 | 18.43 | 2.96 |
| 5 | 1 | 3.98 | 45.00 | 2.09 |
|   | 2 | 3.98 | 45.00 | 2.09 |
|   | 3 | 2.43 | 90.00 | 0.53 |
|   | 4 | 2.43 | 90.00 | 0.53 |
|   | 5 | 3.98 | 45.00 | 2.09 |
|   | 6 | 3.98 | 45.00 | 2.09 |
| 6 | 1 | 2.43 | 18.43 | 0.53 |
|   | 2 | 16.13 | 18.43 | 12.24 |
|   | 3 | 16.13 | 90.00 | 12.24 |
|   | 4 | 11.71 | 45.00 | 8.81 |
|   | 5 | 3.44 | 143.13 | 0.76 |
|   | 6 | 3.98 | 45.00 | 2.09 |
| 7 | 1 | 11.71 | 45.00 | 8.81 |
|   | 2 | 1.72 | 45.00 | 0.38 |
|   | 3 | 11.70 | 135.00 | 6.53 |
|   | 4 | 5.43 | 135.00 | 1.19 |
| 8 | 1 | 3.98 | 45.00 | 2.09 |
|   | 2 | 2.43 | 90.00 | 0.53 |
|   | 3 | 2.43 | 18.43 | 0.53 |
|   | 4 | 5.62 | 18.43 | 2.96 |
|   | 5 | 11.71 | 45.00 | 8.81 |
|   | 6 | 3.44 | 143.13 | 0.76 |
| 9 | 1 | 5.43 | 135.00 | 1.19 |
|   | 2 | 5.43 | 135.00 | 1.19 |
|   | 3 | 2.43 | 90.00 | 0.53 |

TABLE 4-continued list of beam configuration of each base station sector in scene 2

| base station number | housing estate number | longitudinal beam width (°) | horizontal beam width (°) | uptilt angle (°) |
|---|---|---|---|---|
| 10 | 1 | 3.44 | 26.57 | 0.76 |
| | 2 | 4.20 | 18.43 | 2.21 |
| | 3 | 7.92 | 26.57 | 4.17 |
| | 4 | 4.20 | 18.43 | 2.21 |
| 11 | 1 | 3.62 | 18.43 | 1.30 |
| | 2 | 7.47 | 26.57 | 4.17 |
| | 3 | 7.92 | 26.57 | 4.17 |
| | 4 | 12.30 | 18.43 | 9.26 |
| 12 | 1 | 7.92 | 26.57 | 4.17 |
| | 2 | 3.96 | 18.43 | 2.21 |
| | 3 | 21.73 | 26.57 | 16.76 |
| | 4 | 12.30 | 18.43 | 9.26 |
| 13 | 1 | 21.73 | 26.57 | 16.76 |
| | 2 | 12.30 | 18.43 | 9.26 |
| | 3 | 4.20 | 18.43 | 2.21 |
| | 4 | 21.73 | 26.57 | 16.76 |

It should be noted that in this context, the terms "include", "contain" or any other variation are intended to cover non exclusive inclusion so that an article or equipment that includes a series of elements includes not only those elements, but also other elements that are not explicitly listed. Without further restrictions, the element defined by the statement "including a . . . " does not exclude the existence of another same element in the article or equipment including the element. Similar words such as "connect" or "connection" are not limited to physical or mechanical connection, but can include electrical connection, whether direct or indirect.

The above content is a further detailed description of the disclosure in combination with specific preferred embodiments. It cannot be determined that the specific implementation of the disclosure is limited to these descriptions. For those skilled in the art, several simple deduction or replacement can be made without departing from the concept of the disclosure, which shall be deemed to belong to the protection scope of the disclosure.

What is claimed is:

1. A scene-based beam generation method for ground-to-air coverage based on convex polygon subdivision, comprising:
    obtaining a collection of position information of ground base stations in a scene;
    constructing a three-dimensional (3D) low altitude signal coverage area according to the position information of the ground base stations;
    performing convex polygon subdivision on the 3D low altitude signal coverage area to obtain a plurality of n-prism areas, taking the ground base stations on a bottom surface of each of the plurality of n-prism areas as vertexes to build quadrangular pyramid models to cover corresponding the n-prism area, and obtaining corresponding relationships between geometric parameters of each of the quadrangular pyramid models and beam parameters of a corresponding ground base station sector; and
    optimizing a coverage upper limit and a coverage lower limit of each the ground base station sector in each of the plurality of n-prism areas by using a particle swarm optimization (PSO) algorithm with adaptive weight to obtain optimized results, and obtaining a beam configuration range of each of the ground base stations according to the optimized results.

2. The scene-based beam generation method for ground-to-air coverage based on convex polygon subdivision according to claim 1, wherein the obtaining a collection of position information of ground base stations in a scene, comprises:
    converting position coordinates of each of the ground base stations in the scene in a longitude and latitude coordinate system into corresponding position coordinates in a plane coordinate system by using a method of universal transverse mercator (UTM) projection; and
    the collection of the position information of the ground base stations in the scene comprising the converted position coordinates.

3. The scene-based beam generation method for ground-to-air coverage based on convex polygon subdivision according to claim 1, wherein the 3D low altitude signal coverage area is a 3D multi prism shape with a polygon bottom and a height of H, where H≤3000, wherein a contour of the polygon bottom is formed by connecting positions of the ground base stations close to edges of the scene in the scene.

4. The scene-based beam generation method for ground-to-air coverage based on convex polygon subdivision according to claim 1, wherein the ground base stations in each of the plurality of n-prism areas are respectively responsible for signal coverage at different heights and orientations in the each of the plurality of n-prism areas.

5. The scene-based beam generation method for ground-to-air coverage based on convex polygon subdivision according to claim 1, wherein the bottom surface of each of the plurality of n-prism areas is a convex n-polygon with the ground base stations as vertexes, and there is no an overlapping area between any two of the convex n-polygons of the plurality of n-prism areas, and n is 3 or 4.

6. The scene-based beam generation method for ground-to-air coverage based on convex polygon subdivision according to claim 5, wherein the performing convex polygon subdivision on the 3D low altitude signal coverage area to obtain a plurality of n-prism areas, taking the ground base stations on a bottom surface of each of the plurality of n-prism areas as vertexes to build quadrangular pyramid models to cover corresponding the n-prism area, and obtaining corresponding relationships between geometric parameters of each of the quadrangular pyramid models and beam parameters of a corresponding ground base station sector, comprises:
    performing convex polygon subdivision on the collection of position information of the ground base stations by using a rotating calipers algorithm to divide a bottom surface of the 3D low altitude signal coverage area into the convex n-polygons;
    extending each edge of each of the convex n-polygons in a longitudinal vertical direction along the 3D low altitude signal coverage area to obtain the plurality of n-prism areas with the convex n-polygons as the bottom surfaces and heights of H; and
    taking the ground base stations on the bottom surface of each of the plurality of n-prism areas as the vertexes to build the quadrangular pyramid models to cover the corresponding n-prism area, and obtaining the corresponding relationships between the geometric parameters of each of the quadrangular pyramid models and the beam parameters of the corresponding ground base station sector;
    wherein a longitudinal angle of each of the quadrangular pyramid models corresponds to a longitudinal beam width of the corresponding ground base station sector, a horizontal angle of each of the quadrangular pyramid models corresponds to a horizontal beam width of the corresponding ground base station sector, and an included angle between each of the quadrangular pyramid models and ground corresponds to an antenna uptilt angle of the corresponding ground base station sector.

7. The scene-based beam generation method for ground-to-air coverage based on convex polygon subdivision according to claim 1, wherein the optimizing a coverage upper limit and a coverage lower limit of each the ground base station sector in each of the plurality of n-prism areas by using a particle swarm optimization (PSO) algorithm with adaptive weight to obtain optimized results, and obtaining a beam configuration range of each of the ground base stations according to the optimized results, comprises:

calculating an initial coverage rate and an initial overlap rate of each of the plurality of n-prism areas by using a Monte Carlo analysis method;

optimizing the coverage upper limit and the coverage lower limit of the ground base station sector in each of the plurality of n-prism areas by using the PSO algorithm with adaptive weight, and calculating, according to optimized coverage upper limit and optimized coverage lower limit of the ground base station sector and the corresponding relationships, a coverage rate and an overlap rate of the corresponding n-prism area by using the Monte Carlo analysis method in each the optimizing until a preset optimization iteration stop condition is reached to obtain the optimized results of the coverage upper limit and the coverage lower limit of the ground base station sector; and obtaining beam parameters of the ground base station sector according to the optimized results of the coverage upper limit and the coverage lower limit of the ground base station sector, counting the beam parameters of each the ground base station sector to select a maximum value and a minimum value corresponding to the beam parameters, and thereby to obtain the beam configuration range of the ground base station;

wherein the beam parameters comprise a horizontal beam width, a longitudinal beam width and an antenna uptilt angle, and the optimization iteration stop condition is that an overlap rate of the n-prism area is a minimum under a condition that a coverage rate is greater than or equal to a preset value R, $R \in (0, 0.99]$.

* * * * *